(12) United States Patent
Auden et al.

(10) Patent No.: US 10,246,139 B2
(45) Date of Patent: Apr. 2, 2019

(54) METHOD AND APPARATUS FOR CONTROLLING VEHICLE TRACTIVE EFFORT

(71) Applicant: GM GLOBAL TECHNOLOGY OPERATIONS LLC, Detroit, MI (US)

(72) Inventors: Joshua R. Auden, Brighton, MI (US); Jason D. Fahland, Fenton, MI (US); David Dominguez, Tucson, AZ (US); Edward T. Heil, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 164 days.

(21) Appl. No.: 15/216,238

(22) Filed: Jul. 21, 2016

(65) Prior Publication Data

US 2017/0088192 A1 Mar. 30, 2017

Related U.S. Application Data

(60) Provisional application No. 62/232,500, filed on Sep. 25, 2015, provisional application No. 62/232,806, filed on Sep. 25, 2015.

(51) Int. Cl.
*B62D 35/00* (2006.01)
*B62D 37/02* (2006.01)

(52) U.S. Cl.
CPC .......... *B62D 35/00* (2013.01); *B62D 35/005* (2013.01); *B62D 35/007* (2013.01); *B62D 37/02* (2013.01); *Y02T 10/88* (2013.01)

(58) Field of Classification Search
None
See application file for complete search history.

(56) References Cited

U.S. PATENT DOCUMENTS

| 4,810,022 A | * | 3/1989 | Takagi | B62D 35/005 |
| | | | | 180/197 |
| 6,064,931 A | * | 5/2000 | Sawada | B60C 23/061 |
| | | | | 267/140.14 |

(Continued)

FOREIGN PATENT DOCUMENTS

| CN | 101003288 A | 7/2007 |
| CN | 102161354 A | 8/2011 |

(Continued)

*Primary Examiner* — Todd M Melton
*Assistant Examiner* — Jason R Roberson
(74) *Attorney, Agent, or Firm* — Quinn IP Law

(57) ABSTRACT

A multi-wheeled vehicle employing an active aerodynamic control system is described. A method for controlling the vehicle and the active aerodynamic control system includes determining states of parameters related to ride and handling of the vehicle, and determining a current tractive effort based upon the states of parameters related to ride and handling of the vehicle. A desired tractive effort is determined based upon an operator desired acceleration, and an available tractive effort is determined based upon an available downforce transferable to the wheels from the active aerodynamic control system and downforces of the wheels. The active aerodynamic control system controls the downforce on one of the wheels to control the current tractive effort responsive to the desired tractive effort.

15 Claims, 4 Drawing Sheets

(56) References Cited

U.S. PATENT DOCUMENTS

| | | | |
|---|---|---|---|
| 7,213,870 B1* | 5/2007 | Williams | B62D 35/007 296/180.3 |
| 2001/0003805 A1 | 6/2001 | Koibuchi | |
| 2007/0159119 A1* | 7/2007 | Adra | B60K 6/46 318/56 |
| 2008/0211261 A1* | 9/2008 | Wegener | B60T 1/16 296/180.5 |
| 2009/0056612 A1* | 3/2009 | Yap | B63B 1/322 114/273 |
| 2013/0057021 A1* | 3/2013 | Patterson | B60T 1/16 296/180.5 |
| 2015/0232138 A1* | 8/2015 | Parry-Williams | B62D 35/02 296/180.5 |
| 2016/0129951 A1* | 5/2016 | Park | G05D 3/20 296/180.5 |

FOREIGN PATENT DOCUMENTS

| | | | |
|---|---|---|---|
| CN | 102248968 A | * | 11/2011 |
| CN | 102248968 A | | 11/2011 |
| CN | 103342137 A | | 10/2013 |
| DE | 3828752 A1 | | 3/1990 |
| JP | H03217380 A | | 9/1991 |
| KR | 20110098881 A | | 9/2011 |

* cited by examiner

METHOD AND APPARATUS FOR CONTROLLING VEHICLE TRACTIVE EFFORT

CROSS-REFERENCE TO RELATED APPLICATIONS

This application claims the benefit of U.S. Provisional Patent Application No. 62/232,500 filed on Sep. 25, 2015, the disclosure of which is hereby incorporated by reference.

This application claims the benefit of U.S. Provisional Patent Application No. 62/232,806 filed on Sep. 25, 2015, the disclosure of which is hereby incorporated by reference.

TECHNICAL FIELD

The disclosure relates to operation of a vehicle, including a vehicle equipped with an active aerodynamic control system, including controlling tractive effort thereof.

BACKGROUND

Vehicle design related to aerodynamics includes factors affecting vehicle drag, wind noise, vehicle noise emissions, and lift forces that affect traction, cornering and other elements of vehicle stability. Aerodynamic design elements may include passive elements and actively controlled elements. Knowledge of the aerodynamic forces acting on the vehicle are required for precise control of an active aerodynamic system. Known aerodynamic systems are not actively controlled in response to downforce estimations associated with operation of the vehicle. Known methods and systems for controlling tractive effort may employ traction control systems that may apply brake pressure and/or reduce engine and powertrain torque to maximize tractive effort forces.

Vehicle design related to aerodynamics includes factors affecting vehicle drag and downforces, which affect vehicle traction, cornering and other elements of vehicle stability. Aerodynamic design elements may include passive aerodynamic features and/or active aerodynamic features. Passive aerodynamic features are fixed in position and do not move. Active aerodynamic features are moveable and re-positionable to change or control an aerodynamic force, such as an aerodynamic drag force or an aerodynamic downforce that acts on the vehicle. Vehicles may include multiple aerodynamic features, active and/or passive, located at different locations on the vehicle.

SUMMARY

A multi-wheeled vehicle employing an active aerodynamic control system is described. A method for controlling the vehicle and the active aerodynamic control system includes determining states of parameters related to ride and handling of the vehicle, and determining a current tractive effort based upon the states of parameters related to ride and handling of the vehicle. A desired tractive effort is determined based upon an operator desired acceleration, and an available tractive effort is determined based upon an available downforce transferable to the wheels from the active aerodynamic control system and downforces of the wheels. The active aerodynamic control system controls the downforce on one of the wheels to control the current tractive effort responsive to the desired tractive effort.

As such, controlling the vehicle and the active aerodynamic control system includes determining states of longitudinal tire properties, a vehicle speed and rotational speeds of the wheels, and determining wheel slip for each of the wheels based thereon. A coefficient of surface friction is determined for each of the wheels based upon the vehicle speed and the wheel slip for each of the wheels along with a drive torque applied to the wheels. Downforces applied on the wheels and a current tractive effort are determined based upon the coefficient of surface friction for each of the wheels, the static normal forces on the wheels, and the drive torque applied to the wheels. A desired tractive effort is determined based upon the operator desired acceleration, and an available tractive effort is determined based upon an available downforce transferable to the wheels from the active aerodynamic control system and the static normal forces. The active aerodynamic control system controls the downforce on one of the wheels to control the current tractive effort responsive to the desired tractive effort.

The above features and advantages, and other features and advantages of the present disclosure, will be readily apparent from the following detailed description of the embodiment(s) and best mode(s) for carrying out the described disclosure when taken in connection with the accompanying drawings and appended claims.

BRIEF DESCRIPTION OF THE DRAWINGS

One or more embodiments will now be described, by way of example, with reference to the accompanying drawings, in which.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be composed of any number of hardware, software, and/or firmware components configured to perform the specified functions.

Figure 1:
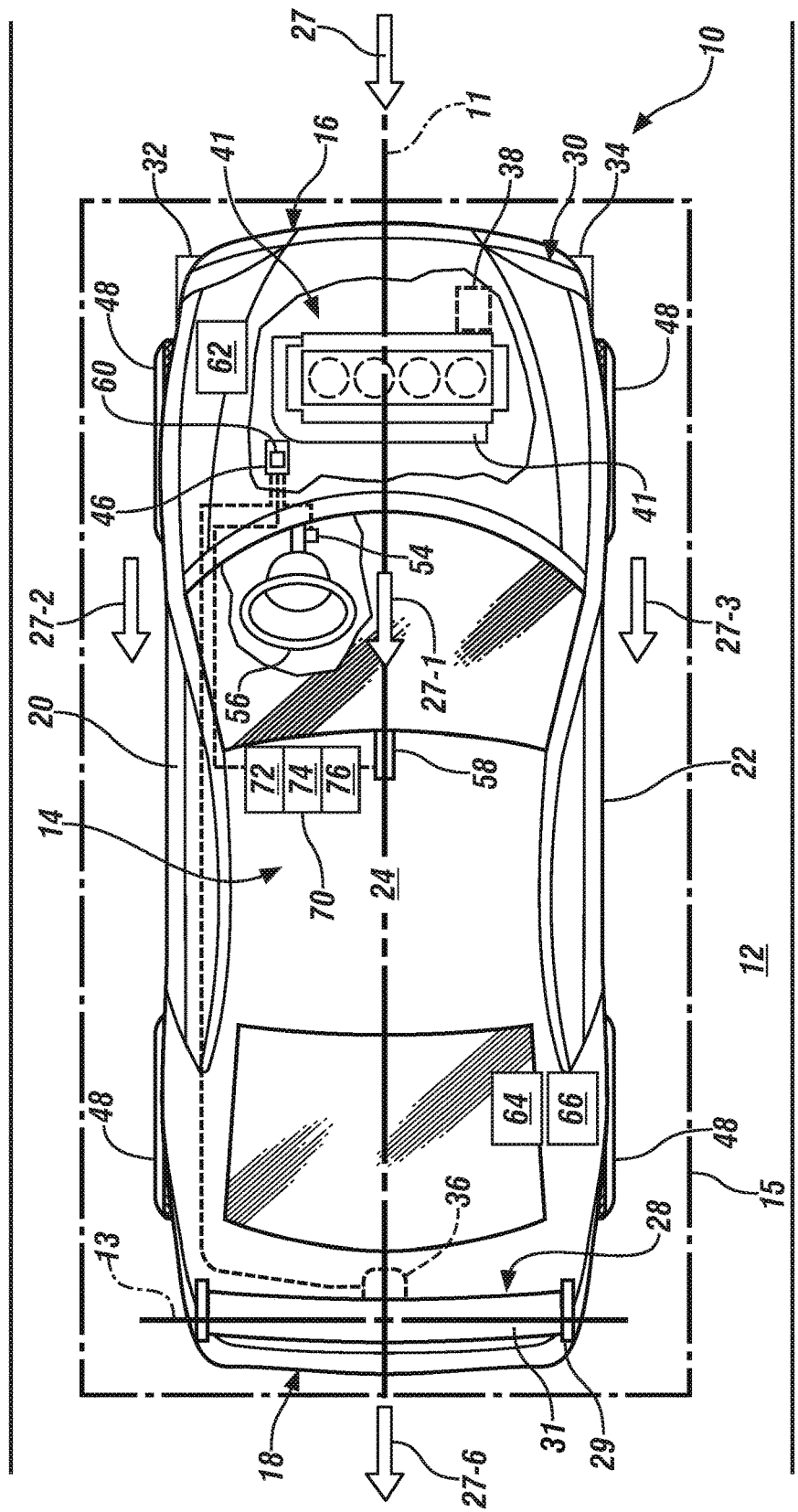
FIG. 1 is a schematic top view of a vehicle equipped with an active aerodynamic control system, in accordance with the disclosure.
Figure 2:
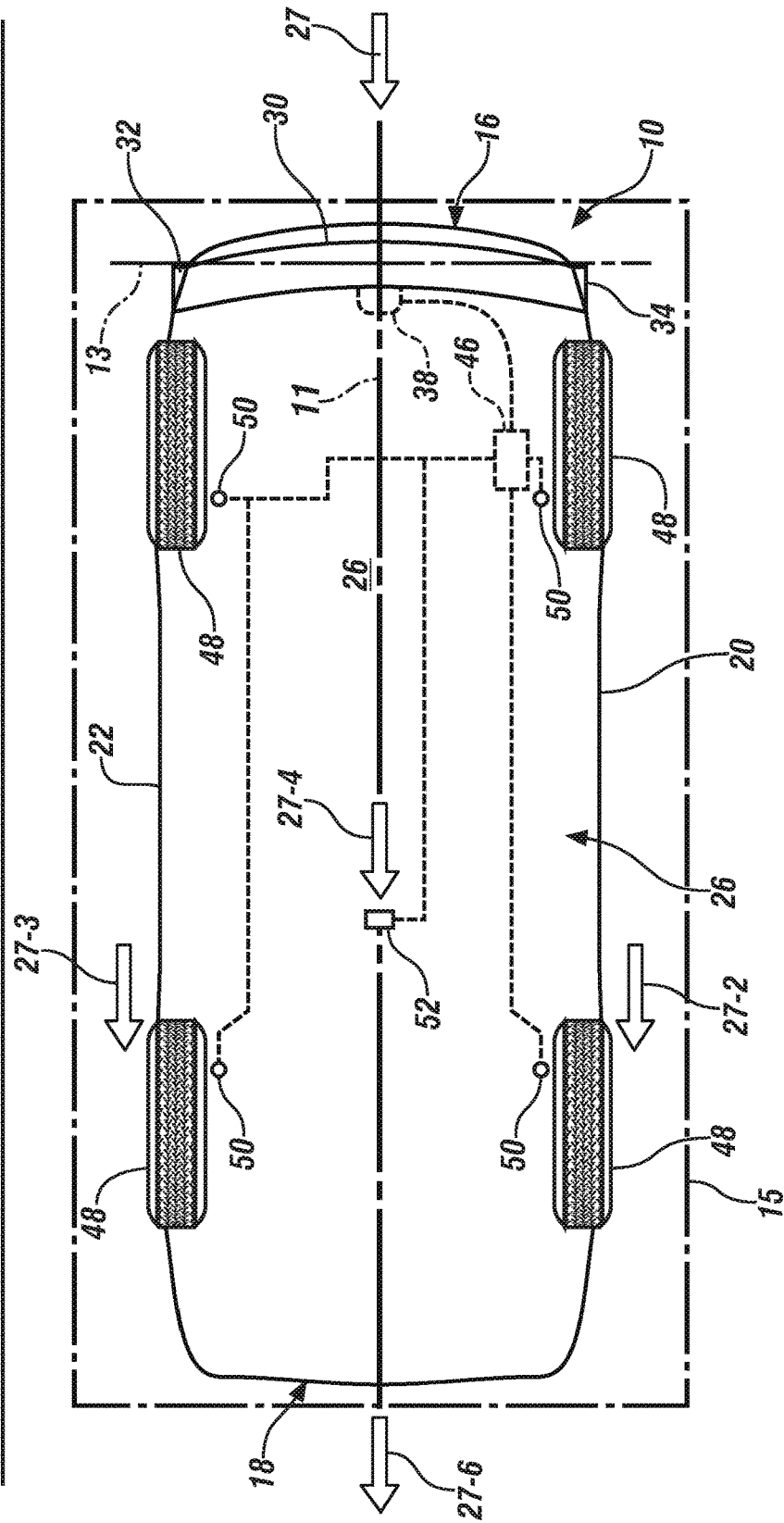
FIG. 2 is a schematic bottom view of the vehicle shown in FIG. 1, in accordance with the disclosure.
Figure 3:
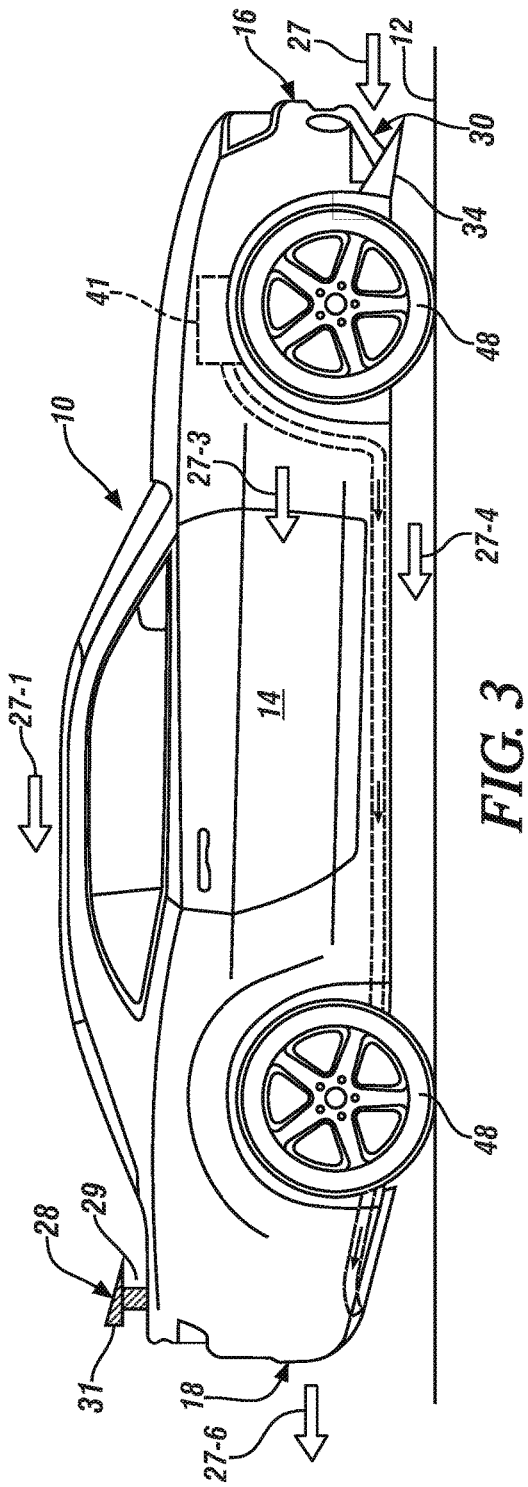
FIG. 3 is a schematic side view of the vehicle shown in FIGS. 1 and 2, in accordance with the disclosure.

Referring to the drawings, wherein like reference numbers refer to like components, FIG. 1 shows a top schematic view, FIG. 2 shows a bottom schematic view, and FIG. 3 shows a side schematic view of a vehicle 10 equipped with an active aerodynamic control system and positioned relative to a road surface 12. The vehicle 10 includes a vehicle body 14 arranged in a body plane P 15 that is substantially parallel to the road surface 12. The vehicle body 14 defines six body sides. The six body sides include a first body end or front end 16, an opposing second body end or rear end 18, a first lateral body side or left side 20, and a second lateral body side or right side 22, a top body portion 24, which may include a vehicle roof, and an underbody portion 26. The vehicle 10 includes a drivetrain that includes a power plant 41 that mechanically couples via a geartrain to one or a plurality of road wheels 48 to transfer mechanical power to a road surface 12 to effect tractive effort. As employed herein, the term "wheel" refers to a rigid rim device on which a tire composed of flexible material, e.g., rubber and other elements is mounted. The power plant 41 may include, by way of non-limiting examples, an internal combustion engine (shown in FIG. 1), a hybrid-electric powertrain (not shown), an electrically-powered motor, or another alternative type of power plant. The geartrain may include an automatic transmission rotatably coupled to a differential or transaxle, or another suitable geartrain configuration. The vehicle 10 may be any suitable vehicle, including, by way of non-limiting examples, a passenger vehicle, a high-performance vehicle, or an off-road vehicle. Operation of the vehicle 10 may be controlled by a controller 46.

The vehicle 10 includes a nominal left side 20 and a nominal right side 22, which are disposed generally parallel to each other and with respect to a virtual longitudinal axis X 11 of the vehicle 10, and span the distance between the front end 16 and the rear end 18. The body plane P 15 is defined to include the longitudinal axis X 11. A passenger compartment (not shown) of the vehicle 10 is generally bounded by the front and rear ends 16, 18 and the left and right sides 20, 22 of the body 14. As understood by those skilled in the art, the front end 16 is configured to face an oncoming ambient airflow 27 when the vehicle 10 is in motion relative to the road surface 12. When the vehicle 10 is in motion, the oncoming ambient airflow 27 moves substantially parallel to the body plane P 15 and along the longitudinal axis X 11.

As the vehicle 10 moves relative to the road surface 12, the ambient airflow 27 passes around the vehicle body 14 and splits into a first airflow portion 27-1, a second airflow portion 27-2, a third airflow portion 27-3, and a fourth airflow portion 27-4 that eventually rejoin in a recirculating airflow region 27-6 that is located immediately behind the rear end 18. Specifically, as shown in FIG. 1, the first airflow portion 27-1 passes over the top body portion 24, second airflow portion 27-2 passes over the left side 20, third airflow portion 27-3 passes over the right side 22, and fourth airflow portion 27-4 (shown in FIG. 2) passes under the vehicle body 14, between the underbody portion 26 and the road surface 12. As understood by those skilled in the art, the recirculating airflow region 27-6 may be generally caused at elevated vehicle speeds by the flow of surrounding air around the six body sides of the vehicle body 14.

The vehicle 10 includes an active aerodynamic control system that preferably includes a moveable front spoiler assembly 30 and a moveable rear spoiler assembly 28. The rear spoiler assembly 28 includes a spoiler body 31 arranged along a spoiler axis Y 13 and configured to control movement of the ambient airflow 27 along the vehicle body 14. The spoiler body 31 may by connected to the vehicle body 14 via one or more stanchions 29, and may be wing-shaped in one embodiment. "Wing-shaped" is herein defined as having a shape of a wing, i.e., a fin having a shape of an airfoil defined by a streamlined cross-sectional shape producing lift for flight or propulsion through a fluid. As can be seen in FIG. 1, the spoiler axis Y 13 may be positioned orthogonal to the longitudinal axis X 11. The spoiler axis Y 13 positioned orthogonal to the longitudinal axis X 11 defines a lateral axis of the vehicle 10. Additionally, the spoiler axis Y 13 is also arranged substantially parallel to the body plane P 15. The rear spoiler assembly 28 may by connected to the vehicle body 14 via one or more stanchions 29. The rear spoiler assembly 28 varies a downforce $F_D2$ exerted by the ambient airflow 27 at the rear of the vehicle 10. The front spoiler assembly 30 may function as an air dam that varies a downforce $F_D1$ exerted by the ambient airflow 27 at the front of the vehicle 10, and may be employed to increase the downforce $F_D1$ at the front of the vehicle 10, while the spoiler assembly mounted on the rear end 18 may be employed to increase the downforce $F_D2$ at the rear of the vehicle 10 in order to increase vehicle traction. The front and rear spoiler assemblies 30, 28 may be fabricated from suitably rigid but low mass materials, such as an engineered plastic or aluminum, for structural stability. The rear spoiler assembly 28 also includes a rear mechanism 36 that is configured to alter the position of the spoiler assembly 28 in response to a control signal. The front spoiler 30 may further include a first, left winglet 32 and a second, right winglet 34, each arranged substantially transversely with respect to the spoiler axis Y 13 and each arranged substantially vertically relative to the road surface 12 and facing the incident ambient airflow 27. As a result, the left and right winglets 32, 34 facilitate trapping pockets of air when the vehicle 10 is in motion. A front mechanism 38 is configured to alter the position of the front spoiler 30 in response to a control signal, and may selectively shift each of the first winglet 32 and the second winglet 34 in a direction substantially transverse to the longitudinal body axis X 11, and thereby adjust a magnitude of the aerodynamic downforce $F_D$ generated by the front spoiler 30. The front mechanism 38 and the rear mechanism 36 may be composed of controllable actuators and suitable hinges, springs and other devices to facilitate movement in response to the respective control signals which originate from the controller 46. The controllable actuators may include, by way of non-limiting examples, electro-mechanical linear devices or rotary devices, pneumatically-controlled devices, or hydraulically-controlled devices. The term "downforce" is defined as the forces acting upon the vehicle body and transferred to the wheels 48 in response to aerodynamic characteristics of the vehicle body 14 when the vehicle is traveling at a known vehicle speed, including those aerodynamic forces that act upon a front spoiler system and/or a rear spoiler assembly on vehicles so equipped. The magnitude of the downforce affects tire friction, and thus affects tractive effort by the vehicle 10 including occurrence of longitudinal wheel slip that may occur during vehicle acceleration and lateral wheel slip that may occur during vehicle cornering. An active aerodynamic control system can control downforce by controlling positions of a front spoiler system and a rear spoiler assembly, e.g., the front spoiler assembly 30 and the rear spoiler assembly 28 of the vehicle 10 described with reference to FIGS. 1, 2 and 3.

The vehicle 10 preferably includes a plurality of sensors for monitoring vehicle operation related to vehicle ride and handling. A plurality of first sensors 50 may be arranged on the vehicle body 14 for detecting rotating speeds of each of the road wheels 48 (shown in FIG. 2). Each first sensor 50 may also be configured to communicate the detected rotating speed of the respective road wheel 48 to the controller 46, while the controller 46 may be configured to correlate the data received from the respective first sensors 50 to road speed of the vehicle 10. The vehicle 10 may also include a second sensor 52 (shown in FIG. 2) configured to detect a yaw moment or rate on the vehicle body 14 relative to the road surface 12 and communicate the detected yaw rate to the controller 46. Additionally, the vehicle 10 may include a third sensor 54 disposed to monitor a steering wheel 56

(shown in FIG. 1) and configured to detect an angle of the steering wheel during operation of the vehicle 10. An intended direction of the vehicle 10 may be identified by the steering wheel angle detected by the third sensor 54 and communicated to the controller 46. The vehicle 10 may additionally include a fourth sensor 58 (shown in FIG. 1) configured to detect velocity of ambient airflow 27 relative to the vehicle 10. The fourth sensor 58 may be additionally configured to communicate the detected velocity of the ambient airflow 27 to the controller 46. The fourth sensor 58 may be, for example, a pitot tube configured to detect a pressure of the ambient airflow 27 at a specific location relative to the vehicle body 14. The controller 46 may execute instructions to correlate the measured pressure to airflow velocity. The aforementioned sensors may be in the form of rotational position sensors, linear position sensors, ultrasonic sensors, laser sensors and inertial-based acceleration sensors. A heading angle calculation may be determined from a pitot tube or other vehicle dynamics information providing inertial estimates. An air density calculation may be derived from manifold absolute pressure and outside air temperatures.

The vehicle 10 includes one or a plurality of systems for actively controlling vehicle ride and handling. This may include one or more routines for controlling position(s) of the front and rear spoiler assemblies 30, 28. This may include an active suspension system 62 that is configured to adjust suspension damping and/or front and rear ride heights in response to a control signal that is based upon operating conditions. Active suspension systems are known. The vehicle 10 may include an active braking system 64 that may include anti-lock braking for controlling wheel braking in response to an operator desired braking, and other features. The vehicle 10 may include an active steering system 66 that may control vehicle steering rates in response to operating conditions. Active braking systems 64 and active steering systems 66, including associated controllers and control routines are known.

The controller 46 is an electronic device that is configured, i.e., constructed and programmed, to control one or more of the front mechanism 38, the rear mechanism 36, the active suspension system 62, the active braking system 64, and the active steering system 66 in response to vehicle operator commands and inputs from the sensors, e.g., the yaw rate detected by the second sensor 52. The controller 46 may be a dedicated controller or have functions that are integrated into another controller. Alternatively, there may be a plurality of controller devices associated with each of the aforementioned systems.

The controller 46 communicates with an operator interface 70. The operator interface 70 includes a plurality of human/machine interface devices through which the vehicle operator commands operation of the vehicle 10, including, e.g., an accelerator pedal 72, a brake pedal 74, a transmission range selector 76 and a steering wheel 56. The accelerator pedal 72 provides a signal including an accelerator pedal position indicating an operator request for vehicle acceleration. The brake pedal 74 provides a signal including a brake pedal position indicating an operator request for vehicle braking or deceleration. An operator desired acceleration may include either an operator request for positive longitudinal vehicle acceleration or an operator request for negative longitudinal vehicle acceleration, i.e., braking/deceleration. The transmission range selector 76 provides a signal indicating direction of operator-intended motion of the vehicle including a discrete number of operator-selectable positions that indicate a preferred direction of vehicle travel in either a forward or a reverse direction. The transmission range selector 76 may also include a tap-up/tap-down lever, which provides an operator with a capability to request a transmission gear upshift or downshift.

The controller 46 may be configured to control one or more of the front mechanism 38, the rear mechanism 36, the active suspension system 62, the active braking system 64, and the active steering system 66 in response to the rotating speeds of the road wheels 48 detected via the first sensor 50 and/or the velocity of the ambient airflow 27 detected via the fourth sensor 58. The controller 46 may be additionally programmed to determine a slip of the vehicle 10 relative to the road surface 12. The slip of the vehicle 10 may include a measure of how much each of the road wheels 48 has slipped laterally in relation to the longitudinal axis X 11, which may indicate that the vehicle 10 has deviated from the intended direction or path along the road surface 12 as identified by the steering wheel angle detected by the third sensor 54. The controller 46 may be programmed to compare the determined steering wheel angle and yaw rate to determine how much the vehicle 10 has deviated from its intended direction or path.

The controller 46 may be configured as a central processing unit (CPU) that is also configured to regulate operation of the power plant 41, or, alternatively, the controller 46 may be a dedicated controller. As such, there may be a plurality of controller devices distributed throughout the vehicle 10, with each controller configured to manage and control operation of a particular system or subsystem. In order to appropriately control operation of the front mechanism 38 and the rear mechanism 36, the controller 46 includes a memory storage device 60, at least some of which is tangible and non-transitory. The memory storage device may be any recordable medium that participates in providing computer-readable data or process instructions. Such a medium may take many forms, including but not limited to non-volatile media and volatile media. Non-volatile media for the controller 46 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 46 may also include a floppy disk, a flexible disk, hard disk, magnetic tape, any other magnetic medium, a CD-ROM, DVD, any other optical medium, etc. The controller 46 can be configured or equipped with other required computer hardware, such as a central processing unit (CPU), a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 46 or accessible thereby may be stored in the memory and automatically executed to provide the required functionality.

Figure 4:
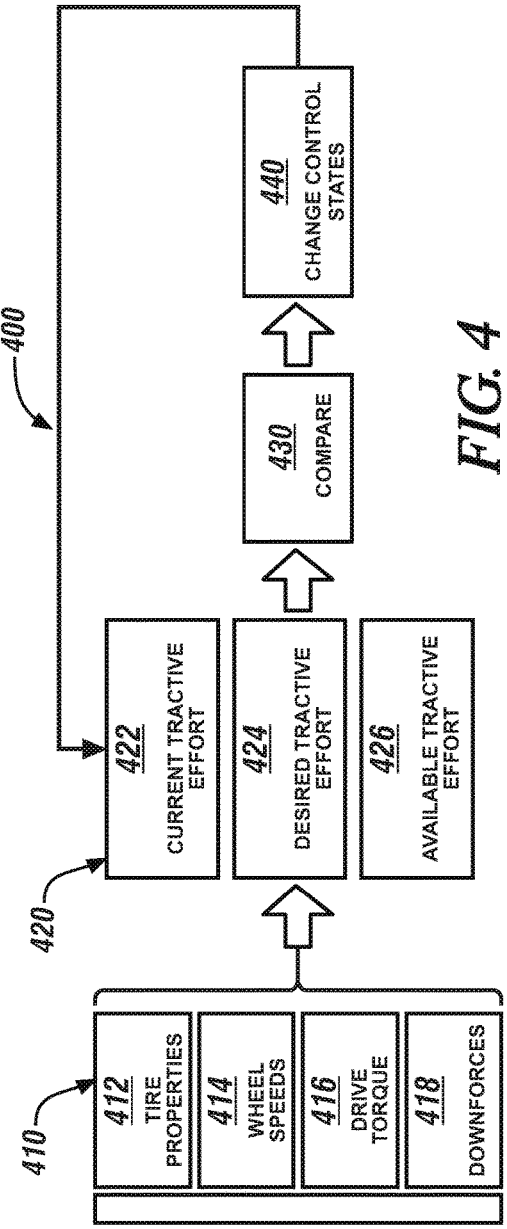
FIG. 4 is a schematic block diagram of a first control routine for controlling the active aerodynamic control system of the vehicle, in accordance with the disclosure.

FIG. 4 schematically shows a routine 400 for controlling a vehicle equipped with an active aerodynamic control system, e.g., an embodiment of the vehicle 10 described with reference to FIGS. 1, 2 and 3. The routine 400 preferably periodically executes to control elements of the active aerodynamic control system to control the downforce on the wheels, thus controlling a current tractive effort in response to a desired tractive effort. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. In one embodiment, this includes as follows.

The routine 400 dynamically determines states of parameters related to ride and handling of an embodiment of the vehicle 10 employing monitoring systems, e.g., the plurality of sensors that monitor vehicle operation, and parametric models (410). The term 'model' refers to a processor-based or processor-executable code and associated calibration that simulates a physical existence of a device or a physical process. Determining the states of the parameters includes determining longitudinal tire properties (412), determining wheel speeds (414), determining an applied wheel torque (416), and determining downforces on the wheels due to static and dynamic weight distribution (418).

The longitudinal tire properties of interest preferably include those properties that affect tire friction and tractive effort, including, e.g., tire pressure and a tire tread surface temperature (412). The longitudinal tire properties may be directly measured, inferred from measurements of related elements, or determined employing a model.

Wheel slip for each of the wheels 48 may be calculated based upon vehicle speed and rotational speeds of all of the wheels 48, preferably employing the wheel speed sensors 50 and wheel speed evaluation techniques that are known to those skilled in the art (414). A coefficient of surface friction for each of the wheels may be determined based upon the vehicle speed and the associated wheel slip for the subject wheel, employing known equations for calculating wheel slip.

A drive torque applied to the wheels 48 is determined, and is based upon information derived from the vehicle power plant 41, the geartrain and the driveline that mechanically couple to one or a plurality of the wheels 48 (416).

Downforces acting on the wheels 48 are determined, and include static normal forces and dynamic normal forces. One embodiment of a process for determining the downforces acting on the wheels 48 is described with reference to FIG. 5. The dynamic normal forces include those forces induced on one or more of the wheels 48 due to effects of vehicle maneuvers such as acceleration, braking and cornering. As understood by those skilled in the art, the static normal forces and dynamic normal forces may be dynamically determined for the vehicle 10 during vehicle operation based upon vehicle operating parameters associated with acceleration, braking and cornering. The static normal forces and dynamic normal forces acting on each of the wheels 48 may be determined empirically or using sensors or parametric models that monitor front and rear vehicle ride height, pitch, roll, yaw rate, and the like.

The routine determines a current tractive effort, a desired tractive effort, and an available tractive effort (420). The current tractive effort for the vehicle 10 may be determined based upon the coefficient of surface friction for each of the wheels, the downforces on the wheels, and the drive torque applied to one or more of the wheels via the drivetrain employing force and torque relationships known to one skilled in the art (422). The desired tractive effort is determined in relation to the operator desired acceleration and the present vehicle speed (424). One skilled in the art is able to determine the desired tractive effort in relation to the operator desired acceleration. The available tractive effort is determined based upon an available downforce transferable to the wheels from the active aerodynamic control system and the downforces (426). The routine 400 compares the magnitudes of the current tractive effort, the desired tractive effort and the available tractive effort (430) to determine whether there is a need to control the active aerodynamic control system to adjust the downforce on one or more of the vehicle wheels.

The routine 400 commands changes to control states of the active aerodynamic control system based upon the comparison of the magnitudes of the current tractive effort, the desired tractive effort and the available tractive effort (440). This may include controlling the active aerodynamic control system to increase the downforce on one or more of the wheels 48 to control the current tractive effort responsive to the desired tractive effort when the available tractive effort is greater than the desired tractive effort and the desired tractive effort is greater than the current tractive effort. This may include controlling the active aerodynamic control system to decrease the downforce on one or more of the wheels 48 to control the current tractive effort responsive to the desired tractive effort when the available tractive effort is less than the desired tractive effort and the desired tractive effort is less than the current tractive effort, thus reducing vehicle drag.

A target downforce is a magnitude of downforce that maximizes vehicle acceleration for a magnitude of driveline torque, thus permitting minimum wheel slip while transferring torque to the ground surface without generating excessive drag force on the vehicle 10. A minimum wheel slip is a magnitude of wheel slip that is achievable in response to the driveline torque without having to induce driveline torque reduction, and may be within a range between 0% and 15% in one embodiment. Torque transferred to the ground surface may be in the form of forward thrust when accelerating, or in the form of vehicle braking when decelerating. The target downforce is specific to a particular vehicle body design and configuration of the vehicle 10.

Calibrations may be developed for the vehicle 10 employing on-vehicle testing on test roads, on-vehicle testing in a wind tunnel, and physics-based analytical techniques. The vehicle 10 may be evaluated in a wind tunnel to experimentally derive an aerodynamic characteristic map. As understood by those skilled in the art, a wind tunnel simulates movement of air around a vehicle under controlled wind speed, temperature and other conditions to determine magnitudes of forces acting upon the vehicle 10 with the vehicle 10 controlled under various parameters. Such parameters include front and rear vehicle ride height, pitch, roll, heading angle, air velocity, vehicle velocity, and position(s) of one or more aerodynamic actuators such as front spoilers and rear spoilers. Evaluating the vehicle 10 in a wind tunnel may include identifying a plurality of vehicle-related factors, determining a plurality of levels for each of the factors, and determining a plurality of related responses. An experiment design may be developed, which may include a multi-level full factorial matrix for evaluating the vehicle 10.

As such, the routine 400 simultaneously considers several vehicle dynamic states including, but not limited to, acceleration, braking, and cornering. Information for these states can be generated from different sources and may be purely feedback, purely feedforward, or a combination of both. The routine 400 may dynamically operate to control a single controllable aerodynamic surface, e.g., the rear spoiler assembly 28, or multiple aerodynamic surfaces, e.g., as described with reference to FIGS. 1 through 3.

The routine 400 dynamically determines a preferred downforce request for each dynamic state during vehicle operation. The associated calibrations and implementations advantageously facilitate accurately optimizing downforce while balancing the downforce distribution over the entire vehicle 10 without having to characterize the entire vehicle 10, thus avoiding development complexity. This may facilitate vehicle stability at higher vehicle speeds and may facilitate maneuverability at lower vehicle speeds. Such a system may simplify pre-production calibration efforts related to aerodynamic mapping and reduce the need for on-vehicle characterizations to optimize vehicle dynamics. There is also less dependence upon physics-based assumptions and estimations related to tire properties, which change constantly and are difficult to model effectively. The routine 400 may improve vehicle stability and ride and handling performance and reduce vehicle drag.

The routine 400, when executed on an embodiment of the vehicle 10, advantageously facilitates operation that continuously maximizes the available tractive effort forces of a vehicle via the active control of aerodynamic elements to optimize aerodynamic downforce, and thus may eliminate a need to use brake interventions and engine torque reductions to accomplish such a task, thus improving vehicle acceleration. This system optimizes longitudinal tire dynamics and maximizes available vehicle tractive effort forces and associated performance via vehicle aerodynamic forces. The routine 400 considers tire properties, applied torque, requested torque, wheel slip, downforces, and available downforces and is a methodology to maximize tractive effort via active control of active aerodynamic element(s) that influence the aerodynamic properties of the vehicle without the application of brake pressure or driveline torque reductions.

Figure 5:
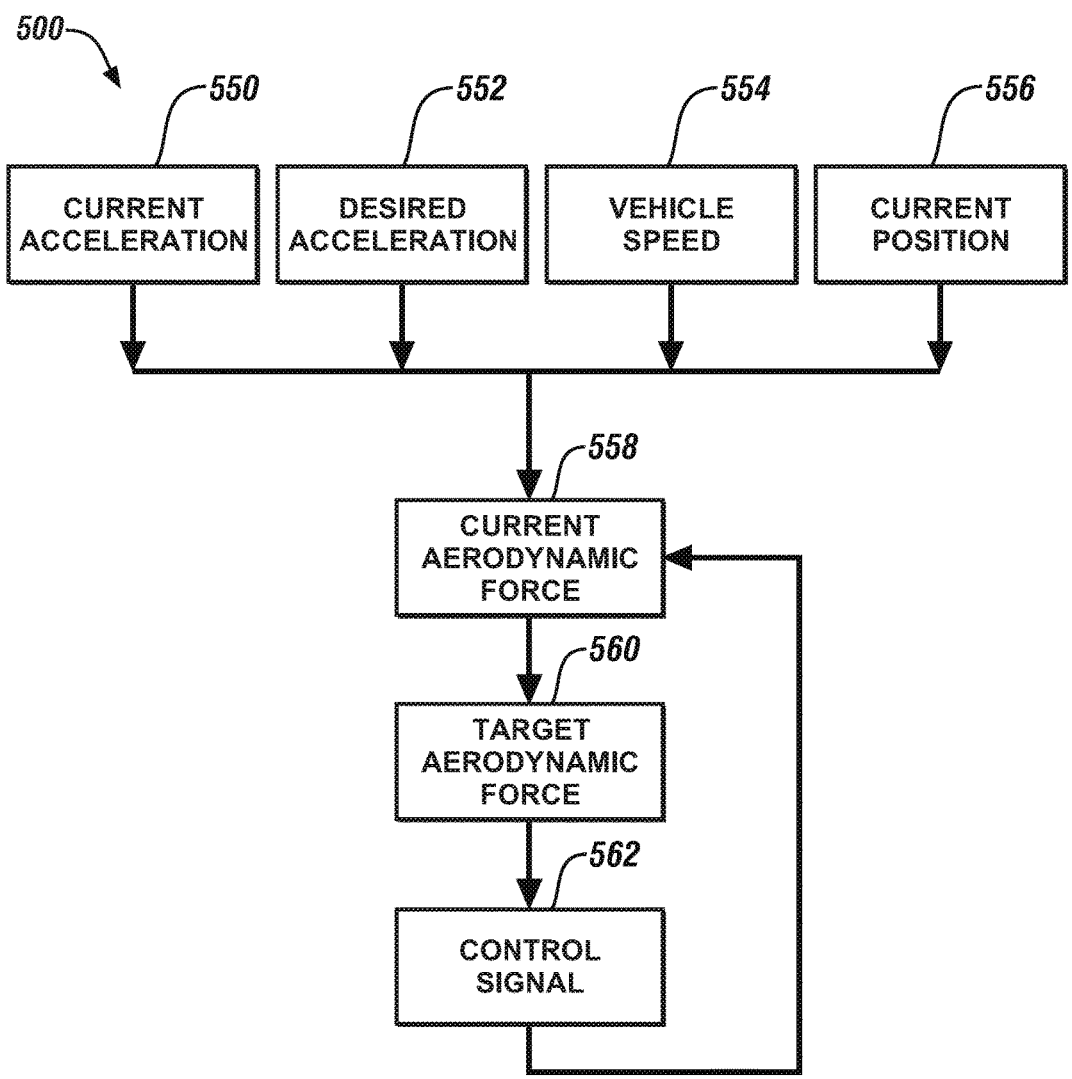
FIG. 5 is a schematic block diagram of a second control routine for controlling the active aerodynamic control system of the vehicle, in accordance with the disclosure.

FIG. 5 shows a process 500 in the form of a flowchart for determining the downforces acting on the wheels 48 as part of a method of controlling an aerodynamic feature of the vehicle 10, i.e., a control position associated with one or both of the moveable front spoiler assembly 30 and the moveable rear spoiler assembly 28. The process includes determining a current longitudinal acceleration of the vehicle 10, generally indicated by box 550. The current acceleration of the vehicle 10 may be either a positive longitudinal acceleration or a negative longitudinal acceleration, and is the longitudinal acceleration of the vehicle 10 at a specific point in time. As used herein, positive longitudinal acceleration is acceleration of the vehicle 10 directed in the same direction of travel of the vehicle 10, i.e., a forward direction. As used herein, negative longitudinal acceleration is acceleration of the vehicle 10 directed in a direction opposite the direction of travel of the vehicle 10, i.e., a rearward direction, and may alternatively be referred to as deceleration.

The controller 46 may determine the current longitudinal acceleration of the vehicle 10 in any suitable manner. For example, the controller 46 may calculate the current longitudinal acceleration from a rotational speed of each road wheel 48 of the vehicle 10 employing data collected with the first sensor 50. The data related to the rotational road wheel 48 speed may be communicated to the controller 46, to enable the controller 46 to calculate the current longitudinal acceleration of the vehicle 10. It should be appreciated that the current longitudinal acceleration of the vehicle 10 may be calculated and/or sensed in some other manner, such as being directly sensed by one or more accelerometers. Alternatively, the current longitudinal acceleration of the vehicle 10 may be provided to the controller 46 through some other vehicle 10 system/controller, which calculates the current longitudinal acceleration of the vehicle 10 for some other vehicular process.

The controller 46 further determines an operator desired acceleration of the vehicle 10, generally indicated by box 552. The operator desired acceleration of the vehicle 10 is determined from operator inputs or requests, indicating an intended or desired reaction from the vehicle 10. The operator desired acceleration may include either a positive longitudinal acceleration or a negative longitudinal acceleration as described above.

The controller 46 may determine the operator desired acceleration in any suitable manner. For example, the controller 46 may determine the operator desired acceleration from a change in position of an accelerator pedal 72 of the vehicle 10 and/or a brake pedal 74 of the vehicle 10. Such a process preferably includes continuously sensing the position of the brake pedal 74 and the accelerator pedal 72 over time to determine and/or identify a change in the position of the brake pedal 74 and/or the accelerator pedal 72, thereby indicating a desired change in the acceleration of the vehicle 10. The position of the brake pedal 74 and the accelerator pedal 72 may be sensed in any suitable manner. For example, one or more position sensors may be used to sense the position of the brake pedal 74 and the accelerator pedal 72, and communicate the data related to the position of the brake pedal 74 and the accelerator pedal 72 to the controller 46, to enable the controller 46 to determine the operator desired acceleration.

For example, an increase in the position of the accelerator pedal 72, such as by further depressing the accelerator pedal 72, may be interpreted by the controller 46 as an intended increase in positive acceleration of the vehicle 10, whereas an increase in the position of the brake pedal 74, such as by further depressing the brake pedal 74, may be interpreted by the controller 46 as an intended increase in negative acceleration of the vehicle 10. It should be appreciated that the change in position of both the brake pedal 74 and the accelerator pedal 72 may be considered simultaneously to determine an overall operator desired change in acceleration. For example, a change in position of both the brake pedal 74 and the accelerator pedal 72 may be simultaneously sensed. In such a case, the controller 46 must determine which input is requesting the greater change in the vehicle acceleration, i.e., the braking input or the accelerator input, and determine the overall operator desired acceleration of the vehicle 10 accordingly. Additionally, the controller 46 may consider the current longitudinal acceleration of the vehicle 10 in making the determination of the operator desired acceleration. It should be appreciated that the controller 46 may obtain the operator desired acceleration in some other manner, such as through communication with some other vehicle 10 system/controller, which calculates the operator desired acceleration of the vehicle 10 for some other vehicular process.

The controller 46 further senses a current speed of the vehicle 10, generally indicated by box 554. The current speed of the vehicle 10 may be sensed and/or determined in any suitable manner, such as with a speed sensor. The speed sensor senses the speed of the vehicle 10, and communicates the data related to the sensed speed of the vehicle 10 to the controller 46. Alternatively, the speed of the vehicle 10 may be provided to the controller 46 through some other vehicle 10 system/controller, which calculates the speed of the vehicle 10 for some other vehicular process.

The controller 46 further senses or otherwise determines a current position of an active aerodynamic feature, which is generally indicated by box 556. The active aerodynamic feature may be a control position associated with one or both of the moveable front spoiler assembly 30 and the moveable rear spoiler assembly 28 described with reference to FIG. 1. For example, the active aerodynamic feature may include a position sensor, which senses data related to the position of the active aerodynamic feature, and communicates the sensed data related to the position of the active aerodynamic feature to the controller 46. It should be appreciated that the controller 46 may sense and/or otherwise obtain the position of the active aerodynamic feature in some other manner not specifically described herein.

Based on the current position of the active aerodynamic feature and the current speed of the vehicle 10, the controller 46 may calculate a current aerodynamic force being generated by the active aerodynamic feature, generally indicated by box 558. The current aerodynamic force may include either the aerodynamic drag force or the aerodynamic downforce described above. The controller 46 may calculate the current aerodynamic force being generated by the active aerodynamic feature, in any suitable manner, such as by referencing a look-up table saved in the memory of the controller 46, which relates the vehicle 10 speed and the position of the active aerodynamic feature to the current aerodynamic force. Alternatively, the controller 46 may use an aerodynamic model of the vehicle 10 to calculate the current aerodynamic force currently being generated by the active aerodynamic feature and acting on the vehicle 10.

The controller 46 defines a target aerodynamic force, generally indicated by box 560. The controller 46 defines the target aerodynamic force based upon the current speed of the vehicle 10, the current longitudinal acceleration of the vehicle 10, and the operator desired acceleration of the vehicle 10. The target aerodynamic force is defined herein as the force, either an aerodynamic drag force and/or an aerodynamic downforce, required to optimize the performance of the vehicle 10 to best achieve the operator requested acceleration. Whether the target aerodynamic force is an aerodynamic drag force and/or aerodynamic downforce depends upon the specific type, configuration and/or location of the active aerodynamic feature. Furthermore, if the vehicle 10 includes multiple active aerodynamic features, it should be appreciated that the target aerodynamic force may include different values for the different active aerodynamic features, depending upon their respective function and location.

The controller 46 may define the target aerodynamic force in any suitable manner. For example, the controller 46 may correlate the current speed of the vehicle 10, the current longitudinal acceleration of the vehicle 10, and the operator desired acceleration to the target aerodynamic force by referencing one or more look-up tables stored in the memory of the controller 46. For the specific values of the current speed of the vehicle 10, the current longitudinal acceleration of the vehicle 10, and the operator desired acceleration, the look-up tables provide a value for the target aerodynamic force for the active aerodynamic feature.

Once the controller 46 has defined the target aerodynamic force for the active aerodynamic feature, the controller 46 sends or communicates a control signal to the active aerodynamic feature, generally indicated by box 562. The control signal controls the active aerodynamic feature to position the active aerodynamic feature to achieve the target aerodynamic force. In other words, the control signal changes the position of the active aerodynamic feature to achieve or generate the target aerodynamic force, given the current speed of the vehicle 10 and the current longitudinal acceleration of the vehicle 10. The controller 46 may use the current position of the aerodynamic feature and/or the current aerodynamic force being generated by the active aerodynamic feature, in order to determine how best to control the active aerodynamic feature and/or how to reposition the active aerodynamic feature to achieve the target aerodynamic force.

It should be appreciated that the process described above of controlling the active aerodynamic feature to achieve the target aerodynamic force that best optimizes performance of the vehicle 10 for the desired acceleration of the vehicle 10 is an iterative process that continuously repeats itself as the current speed of the vehicle 10 changes over time, the current longitudinal acceleration of the vehicle 10 changes over time, and the operator desired acceleration changes over time. Accordingly, the current speed of the vehicle 10 is continuously sensed and the value redefined, the current longitudinal acceleration of the vehicle 10 is continuously determined and redefined, the operator desired acceleration is continuously determined and redefined, and the position of the active aerodynamic feature is continuously monitored and being redefined, as the target aerodynamic force is continuously redefined for the current dynamic operating conditions of the vehicle 10.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of controlling a vehicle having an active aerodynamic feature including a moveable front spoiler assembly disposed on a front end of the vehicle and a moveable rear spoiler assembly disposed on a rear end of the vehicle, the method comprising;

determining a current longitudinal acceleration of the vehicle;

determining an operator desired acceleration of the vehicle;

sensing a current speed of the vehicle;

defining a target aerodynamic force based upon the current speed of the vehicle, the current longitudinal acceleration of the vehicle, and the operator desired acceleration of the vehicle; and sending a first control signal to the moveable front spoiler assembly to adjust a position of the moveable front spoiler assembly and sending a second control signal to the moveable rear spoiler assembly to adjust a position of the moveable rear spoiler assembly to achieve the target aerodynamic force.

2. The method set forth in claim 1, wherein determining the current longitudinal acceleration of the vehicle includes sensing a rotational speed of each wheel of the vehicle and communicating the sensed rotational speed of each wheel to the vehicle controller.

3. The method set forth in claim 2, further comprising calculating the current longitudinal acceleration of the vehicle from the sensed rotational speed of each wheel of the vehicle.

4. The method set forth in claim 1, wherein the current longitudinal acceleration of the vehicle includes one of a positive longitudinal acceleration and a negative longitudinal acceleration.

5. The method set forth in claim 1, wherein determining the operator desired acceleration includes sensing a position of a brake pedal of the vehicle and a position of an accelerator pedal of the vehicle and communicating the sensed position of the accelerator pedal and the brake pedal to a vehicle controller.

6. The method set forth in claim 5, wherein determining the operator desired acceleration comprises determining the operator desired acceleration based upon the position of the accelerator pedal, the position of the brake pedal, and the current longitudinal acceleration of the vehicle.

7. The method set forth in claim 1, wherein the operator desired acceleration includes one of a positive longitudinal acceleration and a negative longitudinal acceleration.

8. The method set forth in claim 1, further comprising sensing a current first position of the moveable front spoiler assembly and a current second position of the moveable rear spoiler assembly and communicating the sensed first and second positions to a vehicle controller.

9. The method set forth in claim 8, further comprising calculating a current aerodynamic force generated by the moveable front spoiler assembly and the moveable rear spoiler assembly based on the first and second positions and the current speed of the vehicle.

10. The method set forth in claim 9, wherein defining the target aerodynamic force comprises defining the target aerodynamic force based upon the current aerodynamic force generated by the moveable front spoiler assembly and the moveable rear spoiler assembly at the current speed of the vehicle.

11. The method set forth in claim 1, wherein defining the target aerodynamic force comprises correlating the current speed of the vehicle, the current longitudinal acceleration of the vehicle, and the operator desired acceleration to the target aerodynamic force with a target aerodynamic force listed in at least one look-up table stored in a memory of the vehicle controller.

12. The method set forth in claim 1, wherein the steps of defining the target aerodynamic force and sending the first and second control signals to the active aerodynamic feature to re-position the active aerodynamic feature to achieve the target aerodynamic force are continuously repeated as the current speed of the vehicle changes over time, the current longitudinal acceleration of the vehicle changes over time, and the operator desired acceleration changes over time.

13. The method set forth in claim 1, wherein the target aerodynamic force is at least one of an aerodynamic downforce and an aerodynamic drag force.

14. The method of claim 1, wherein the moveable front spoiler assembly includes a first winglet disposed on a left side of the front end of the vehicle and a second winglet disposed on a right side of the front end of the vehicle;

and wherein sending a first control signal to the moveable front spoiler assembly to adjust a position of the moveable front spoiler assembly comprises controlling the first winglet and controlling the second winglet to achieve the target aerodynamic force.

15. The method of claim 14, wherein the target aerodynamic force comprises a downforce, and wherein the controlling the first winglet and controlling the second winglet to achieve the target aerodynamic force comprises controlling the first winglet to achieve the target aerodynamic force on the left side of the front end of the vehicle and controlling the second winglet to achieve the target aerodynamic force on the right side of the front end of the vehicle.

* * * * *